United States Patent [19]

Woodman, Jr.

[11] Patent Number: 5,205,899

[45] Date of Patent: Apr. 27, 1993

[54] THERMAL EXPANSION COMPENSATED HOT KNIFE

[75] Inventor: Daniel W. Woodman, Jr., Beverly, Mass.

[73] Assignee: Gloucester Engineering Co., Inc., Gloucester, Mass.

[21] Appl. No.: 893,463

[22] Filed: Jun. 4, 1992

[51] Int. Cl.$^5$ .............................................. B32B 35/00
[52] U.S. Cl. ..................................... 156/515; 53/373.7; 53/375.9; 100/93 P; 156/583.1; 156/583.3; 156/583.4
[58] Field of Search ................. 156/515, 583.1, 583.3, 156/583.4; 53/373.7, 375.9; 100/93 P

[56] References Cited

U.S. PATENT DOCUMENTS 3,284,269 11/1966 Grevich .............................. 156/515
3,779,838 12/1973 Wech .................................. 156/583
4,431,474 2/1984 Gronck et al. ..................... 156/583.1
4,449,962 5/1984 Copia .................................. 493/209

*Primary Examiner*—David A. Simmons
*Assistant Examiner*—Merrick Dixon
*Attorney, Agent, or Firm*—D. J. Shade

[57] ABSTRACT

A heat sealing bar assembly is disclosed that is intended to avoid distortion of the heat sealing edge due to thermal expansion of the heated sealing bar with respect to the unheated support beam to which it is mounted. The mounting means include a fixed center support, end supports that permit axial sliding of the ends of the heated seal bar with respect to the support beam, and a series of jacking screws between the center support and the end support for adjusting the shape of the heated sealing bar.

8 Claims, 5 Drawing Sheets

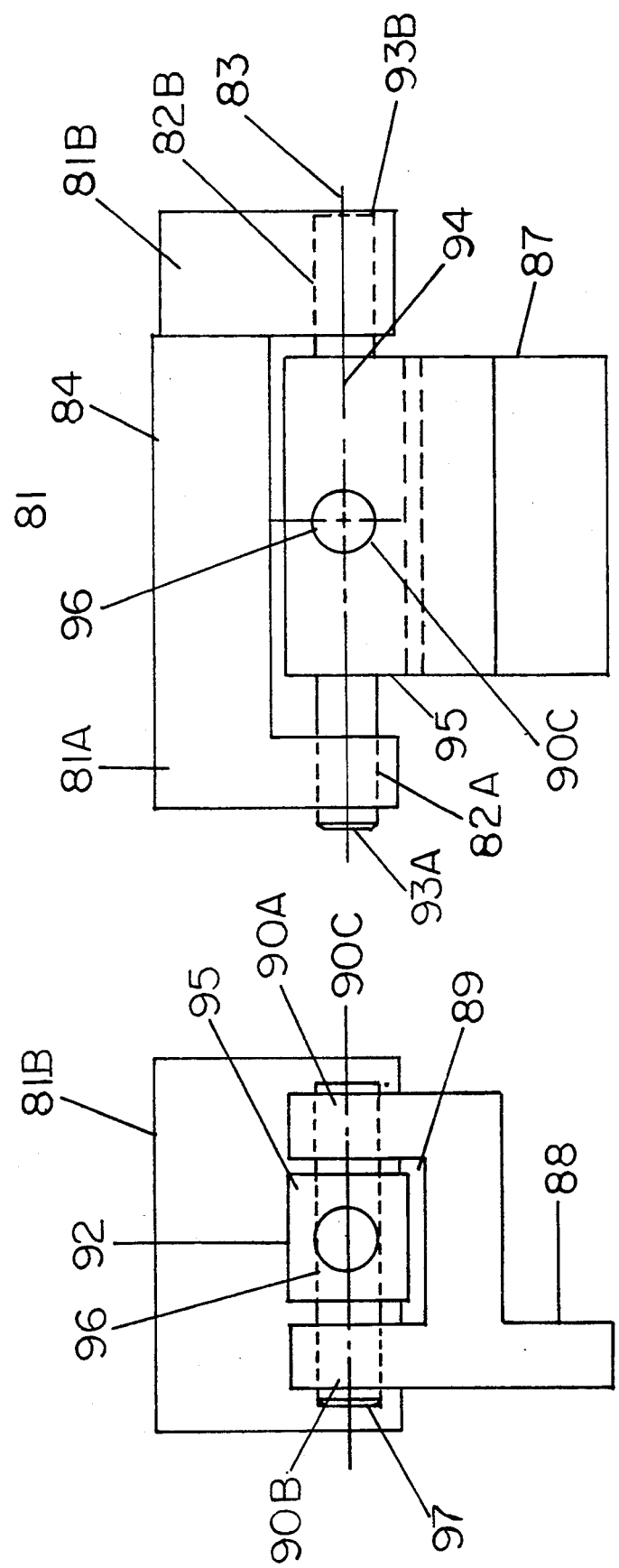

THERMAL EXPANSION COMPENSATED HOT KNIFE

BACKGROUND OF THE INVENTION

1. Field of the Invention

The present invention deals with heated sealing bars commonly used to fuse layers of plastic film in bag making machinery, including those seal bars which simultaneously heat seal and sever portions of the web.

2. Prior Art

Heat sealing bars commonly used in bag making machinery commonly consist of two basic assemblies. The first is a structural beam extending across the width of the bag machine and mounted to the mechanism used to move the seal bar towards and away from the plastic web, while the second is a shaped bar used to contact the web and which includes one or more heating elements, temperature measuring elements, and common structural fasteners. The heated sealing bar is desirably mounted to the structural beam in such a manner that the heat flow path from the seal bar to the beam is small and so that heating or repeated heating of the seal bar does not result in distortion of the sealing bar. Although minimum cross sectional heat flow areas have been attained, freedom from distortion has remained a chronic problem.

U.S. Pat. No. 3,779,838 discloses and claims a seal bar structure which consists of an upper half and a lower half sandwiched around the heating elements. The upper half of the seal bar is discontinuous and is resiliently mounted to the continuous lower half, with the heating element between the upper and lower bar halves. Alternate sections of the upper half of the seal bar are mounted to the support beam or solely to the lower half of the seal bar. The heating element is relatively free to expand, thereby eliminating warping stresses and maintaining the bar straight.

U.S. Pat. No. 4,449,962 discloses and claims a seal bar structure intended to allow relatively free expansion of the heated seal bar structure with respect to the supporting beam, while further providing the ability to deform the bar to compensate for any distortion which does occur. The heated seal bar assembly of the patent, at least as far as the issue of deformation is concerned, is of typical configuration, i.e. continuous upper and lower halves sandwiched about the heating element. What is new, however, is the method of connecting the seal bar to the supporting beam. The supporting beam consists of upper and lower flanges connected by diagonal bracing. The seal bar is attached to the support beam by a series of long threaded rods which pass through the upper and lower flanges of the support beam and into the upper half of the seal bar. Accommodation for lengthwise expansion is provided by elongating the apertures through which the long threaded rods pass in the longitudinal direction of the beam. A series of Belville washers are placed between the nut on the threaded rod and the upper surface of the upper flange to bias the seal bar towards the beam. Two threaded bores in the lower flange are arranged diagonally about each elongated aperture. Screws are passed through these threaded bars into contact with the upper surface of the seal bar. Judicious tightening and loosening of all the bolts allow correction of vertical plane distortion of the seal bar.

A thermo compression bonding tool is disclosed and claimed in U.S. Pat. No. 4,431,474. The bonding rail, which is of similar construction to a seal bar, i.e. a relatively long shaped metal section about an electric heating element, is biased against a plurality of alignment ribs on a support element. The lower surfaces of the alignment ribs define the plane against which the upper surface of the bonding rail rests. Near the middle of the bonding rail the bias means is pin connected to the rail; the rail is free to expand longitudinally along the plane defined by the alignment ribs.

SUMMARY OF THE INVENTION

In accordance with the present invention, a complete seal bar structure is disclosed that avoids thermal expansion related distortion of the seal bar. Additionally, the seal bar structure is equipped with a series of deflecting bolts to provide for initial alignment.

The complete seal bar structure consists of three separate assemblies: the support beam, which includes provisions for mounting the complete seal bar assembly to the mechanism which reciprocates the seal bar assembly towards and away from the workpiece; the heated seal bar itself; and the means for mounting the seal bar to the support beam. While both the seal bar and the beam are generally old, the apparatus connecting the two are new. Briefly, the apparatus comprises an end support member adapted to permit axial sliding of the seal bar with respect to the support beam and to permit rotation of the seal bar end in a plane parallel to the plane of seal bar reciprocation; a fixed center support; and one or more jacking bolt assemblies located between the center support and each end support. The jacking bolts and center support are adjusted to obtain the desired contact between the seal bar and seal roll, while the free axial expansion and contraction of the seal bar with respect to the support beam provided by the end support avoids the buildup of stresses in the seal bar that would affect the desired contact pattern.

BRIEF DESCRIPTION OF THE DRAWINGS

FIG. 3 shows a front view of an end support assembly.

FIG. 4 shows a side view of an end support assembly.

DESCRIPTION OF THE PREFERRED EMBODIMENT

Figure 1:
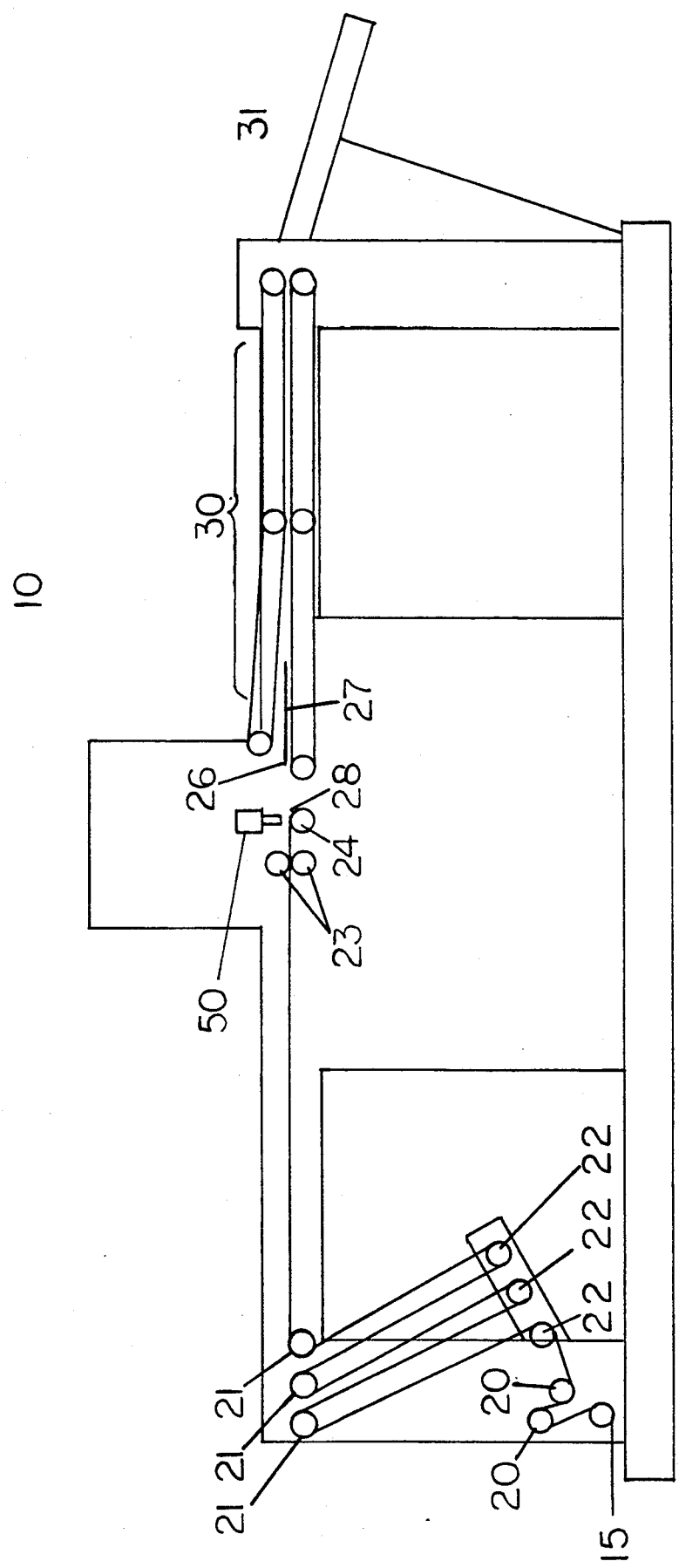
FIG. 1 shows a plastic bag making machine utilizing the current heat sealing apparatus.

A bag making machine 10 utilizing a heat sealing bar 50 according to the present invention is show in FIG. 1. Plastic film 15 is drawn into bag making machine 10 by driven capstan rollers 20. Film 15 passes alternately over a series of fixed rolls 21 and dancer rolls 22 and between draw rolls 23. Located adjacent to and downstream from draw rolls 23 is seal roll 24. Seal bar 50 is mounted directly above seal roll 24 and reciprocates towards and away from seal roll 24. At the time a bag is heat sealed, plastic film 15 previously drawn by draw rolls 23 overlies seal roll 24. Seal bar 50 descends onto the plastic film 15 overlying seal roll 24 and melts through plastic film 15 simultaneously forming the trailing edge seal 26 of bag 27, and the leading edge seal 28 of the next bag to be formed, and separating bag 27 from plastic film 15. Seal bar 50 is then raised from seal roll 24 to complete the sealing cycle. Bag 27 is transported by take away conveyor system 30 and deposited at stacking station 31.

Figure 2:
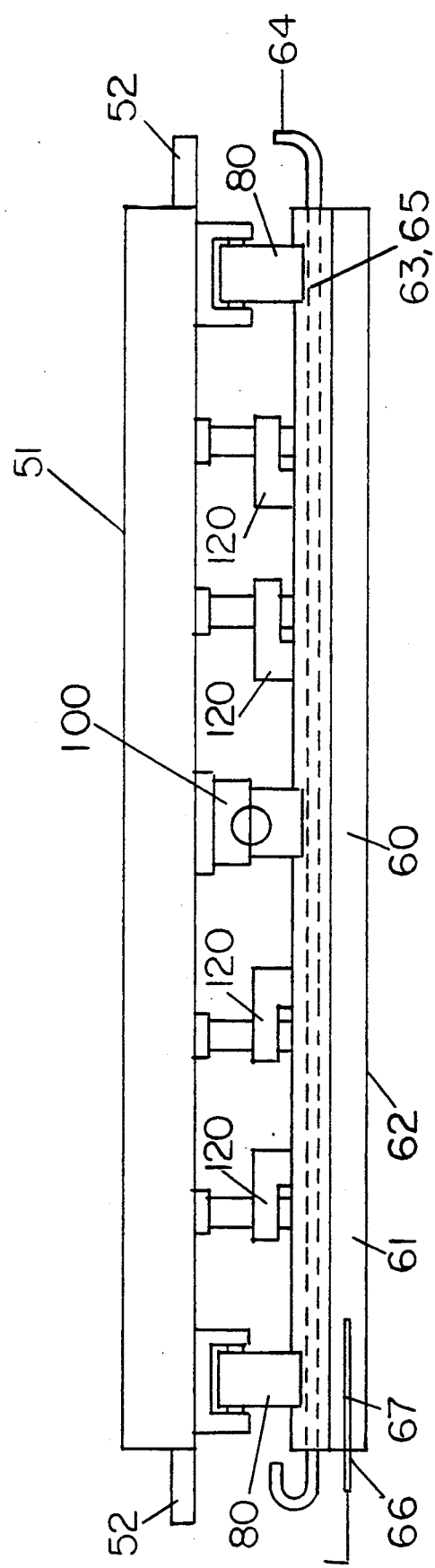
FIG. 2 shows a heat sealing bar in accordance with the current invention.

Heat seal bar assembly 50 is shown in greater detail in FIG. 2. A support and stiffening beam 51 forms the basic structural element of seal bar assembly 50. Although shape of the section of beam 51 is not critical, a section having a flat lower surface, i.e. the surface to which the hot knife blade assembly 60 will be mounted, is in practice found to be a convenience. A rectangular cross section tube in which the long dimension of the rectangle is parallel to the direction of reciprocation of the seal bar is preferred. A trunion mount 52 is provided at each end of beam 51 for mounting the compete heat seal bar assembly 50 to the reciprocating mechanism (not shown in FIG. 2).

Hot knife blade assembly 60 is comprised of four major pieces. Hot knife body 61 has a radiused sealing edge 62 for contacting and sealing film 15 as it lays on seal roll 24. An elongated channel 63 runs along the full length of hot knife body 61 and is adapted to contain electrical resistance heating element 64. Heating element 64 is held in elongated channel 63 by continuous closure strip 65. The fits between hot knife body 61 and heating element 64, heating element 64 and closure strip 65, and hot knife body 61 and closure strip 65 are all intended to provide for essentially continuous metal to metal contact to provide for uniform heat transfer from heating element 64 to radiused sealing edge 62. In its preferred configuration, hot knife blade assembly 60 will also include a thermocouple 66 mounted in a bore 67; bore 67 parallels channel 63 and is located between channel 63 and radiused sealing edge 62. Thermocouple 66 should be connected to a temperature controller, not shown, used to modulate heating element 64.

Hot knife blade assembly 60 is mounted to support beam 51 by means of end support assemblies 80, center support assembly 100, and one or more jacking bolt assemblies 120 intermediate center support assembly 100 and end support assembly 80. While the number of jacking bolt assemblies 120 that will be used between center support assembly 100 and end support assembly 80 will vary with the absolute length of hot knife body 61, the number or spacing is not particularly critical; currently, spacing between adjacent facing bolt assemblies 120 or between jacking bolt assembly 120 and either center support assembly 100 or end support assemblies 80 in the range of 5" to 10" is preferred.

FIG. 3 shows a front view seal bar end support assembly in accordance with the present invention, while FIG. 4 shows a side view of the end support assembly. There is an upper two piece bracket 81 having individual pieces 81a and 81b, of a generally inverted U-shape adapted to be mounted to the underside of support beam 51. Although not shown in FIG. 3, upper bracket piece 81a will contain conventional means for mounting upper bracket 81 to support beam 51. One or more bolts and at least two dowel pins placed to ensure alignment of the bracket to the beam in the currently preferred method of attachment. There are two bores 82a and 82b, one in each of the descending legs 81a and 81b of upper bracket 81, that are on the same centerline 83. Centerline 83 is also essentially parallel to mounting surface 84 of upper bracket 81.

There also is a lower bracket 87 adapted to be mounted to hot knife body 61 along mounting surface 88. It has been found that bolting and doweling lower bracket 87 to hot knife body 61 is a satisfactory method of attachment. Lower bracket 87 also has a rectangular cross section slot 89 along the upper surface parallel to mounting surface 88. Midway along the axial length of slot 89, approximately at the half depth of slot 89, are two bores 90a, 90b, having common centerline 90c oriented transversely to slot 89.

Upper bracket 81 and lower bracket 87 are flexibly connected by cross 92. Cross 92 has two cylindrical ends 93a, 93b having a common centerline 94 projecting from a rectangular cross section body 95. There is a bore 96 centered in body 95 oriented perpendicular to common centerline 94. Bore 96 is adapted to receive dowel pin 97.

End support 80 is assembled as follows: the rectangular cross section body 95 of cross 92 is placed in rectangular cross section slot 89 of lower bracket 87 so that the common centerline 90c of bores 90a and 90b is aligned with the centerline of bore 96 in body 95. Dowel pin 97 is then passed through bore 90a, 96 and 90b. The dimension of bores 90a and 90b had previously been selected to provide a running fit with dowel pin 97, while the diameter of bore 96 had been selected to provide an interference fit with dowel pin 97. The larger section 81a of upper bracket 81 is then attached to the bottom side of support beam 51. Cylindrical end 93a of cross 92 is then inserted in bore 82a of upper bracket 81, and bore 82b in the smaller section of upper bracket 81, 81b is slid over cylindrical end 93b, and section 81b is fastened to bracket piece 81a. Lower bracket 87 is then attached to hot knife body 61. As shown in FIG. 2, two end support assemblies are preferably used in each blade assembly 60, one at or near each end of hot knife body 61.

Figure 5:
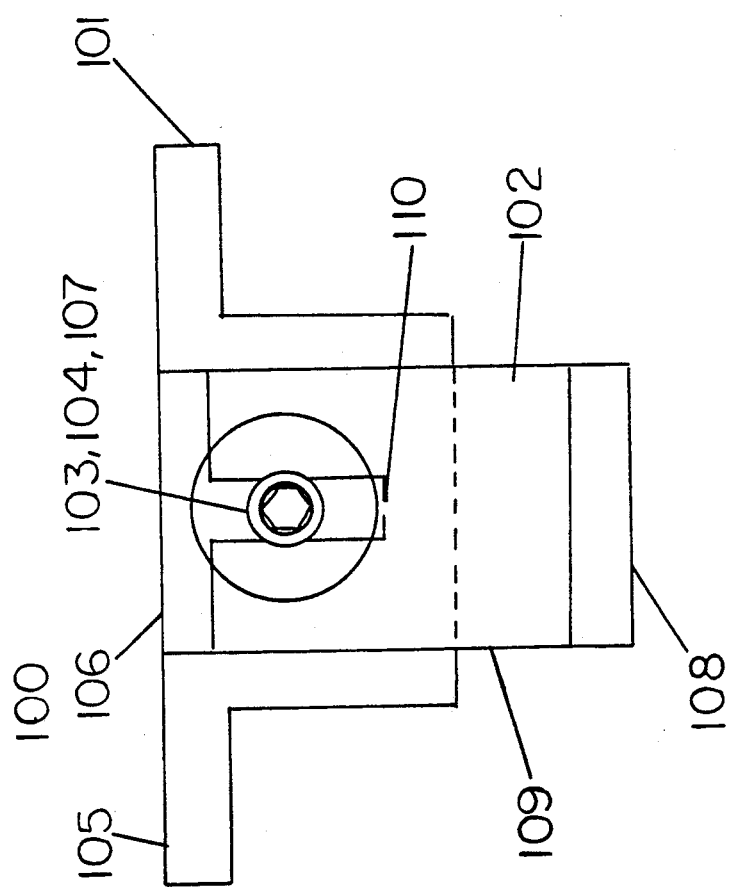
FIG. 5 shows a fixed center support assembly.

The center support assembly 100 is shown in FIG. 5. The purposes of support 100 are to fix one point, preferably near the center, of hot knife blade assembly 60 with respect to support beam 51; to prevent rotation of hot knife blade assembly 60 about cylindrical ends 93a and 93b of cross 92 in bores 82a and 82b in upper bracket 81; and to space hot knife blade assembly 60 from support beam 51.

Center support assembly 100 consists of an upper bracket 101 and a lower bracket 102 joined by a screw 103 and washer 104. Upper bracket 101 has surface 105 adapted to be mounted to the underside of support beam 51. Across the face of upper bracket 101 running in a direction normal to mounting surface 105 is groove 106. Centered in groove 106 is threaded bore 107. Lower bracket 102 includes a mounting surface 108 for contacting hot knife body 61, an upstanding lug 109, and a slot 110 centered in lug 109. The dimensions of groove 106 and upstanding lug 109 in the direction parallel to the long dimension of beam 51 are related so that there will be a close running fit between groove 106 and lug 109.

Center support 100 is installed as follows: upper bracket 101 is mounted to the lower surface of support beam 51. Lower bracket 102 is placed on the upper surface of hot knife body 61 with surface 108 on hot knife body 61 and upstanding lug 109 in groove 106. Screw 103 having washer 104 mounted thereon is passed through slot 110 in lug 109 and screwed into threaded bore 107 in upper bracket 101. As described later in this disclosure, following setting of seal bar bow by means of jacking bolt assemblies 120, screw 103 will be tightened to clamp upstanding lug 109 of lower bracket 102 to upper bracket 101.

Figure 6:
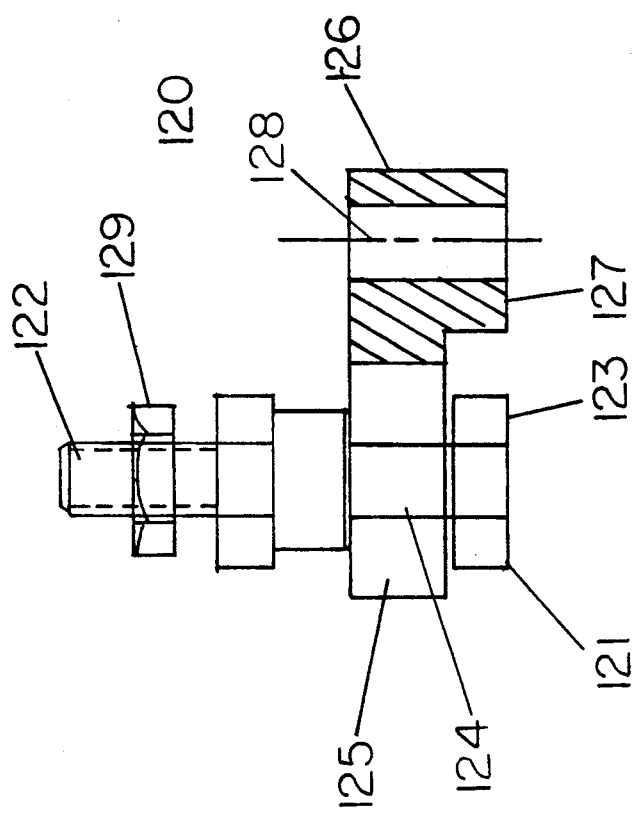
FIG. 6 shows a jacking bolt assembly.

A jacking bolt assembly 120 is shown in FIG. 6. Jacking bolt 121 has a threaded end 122 for engagement with threaded bores on the underside of support beam 51, a flat bottom end 123 for contacting the top surface of hot knife body 61. Jacking bolt 121 also has a reduced diameter cylindrical section 124 that will be engaged by the open ended slot 125 of jacking bolt cover 126. Jacking bolt cover 126 has mounting surface 127 pierced by bore 128 to permit screw mounting to the top surface of hot knife body 61.

Jacking bolt assemblies 120 is mounted by first threading lock nut 129 well onto threaded end 122 of jacking bolt 121, and then screwing threaded end 122 into a threaded bore on the underside of support beam 51. Following attachment of support beam 51 and hot knife blade assembly 60 at the end support assemblies 80 and the fixed center support 100, jacking bolt cover 126, more specifically open ended slot 125 of cover 126 is slid around cylindrical section 124 of jacking bolt 121. A screw is then passed through bore 128 into a threaded bore on the top surface of hot knife body 61. The layout of the threaded bores in support beam 51 and in hot knife body 61 are such that open ended slot 125 in jacking bolt cover 126 is parallel to the long dimension of hot knife body 61.

Operationally, the hot knife 60 is mounted to the support beam 51 as follows. The large piece 81a of end support assembly is mounted to the bottom surface of support beam 51. One of the cylindrical ends 93a of cross 92 is slid into bore 82a, and then bore 82b in upper bracket segment 81b is slid over cylindrical end 93b, and upper bracket segment 81b is fastened to upper bracket segment 81a. Cross 92 should now slide freely within bores 82a and 82b. Dowel pin 97 has previously been passed through bores 90a, 96 and 90b after rectangular cross section body 95 of cross 92 had been placed in rectangular cross section slot 89 of lower bracket 87. Lower bracket 87 should rotate freely about dowel pin 97. This procedure is repeated at the other end of the beam, so that both end support assemblies 80 are mounted on beam 51.

Next, jacking bolts 121 are screwed into the threaded bores on the underside of support beam 51, after threading lock nut 129 onto threaded end 122 of jacking bolt 121.

Hot knife body 61 is now attached to both end support brackets 87. At this point, hot knife body 61 is free to rotate about cylindrical ends 93a, 93b in bores 82a, 82b, as well as slide axially consistent with the clearance between the inside face of the descending legs of upper bracket 81 and the face of the rectangular cross section body 95 of cross 92.

Center support assembly 100 is now attached to both support beam 51 and hot knife body 61 after loosing screw 103. Upper bracket 101 is fastened to the underside of support beam 51, while lower bracket 102 is fastened to hot knife body 61.

Jacking screws 121 are then rotated to bring flat bottom end 123 into contact with the upper surface of hot knife body 61. A jacking bolt cover 126 is then slipped over reduced diameter cylindrical section 124 of each jacking bolt 121, and then screwed to the top surface of hot knife body 61.

At this point the complete heat seal bar assembly 50 should be mounted on bag making machine 10 through the trunion mounts 52. The knife is now ready for bow adjustment.

Each lock nut 129 on each jacking bolt assembly should be loose. Screw 103 on center support assembly 100 should by only slightly loosened, as this screw prevents rotation of hot knife body 61 about cylindrical ends 93a, 93b of end support assemblies 80. Bow hot knife 60 by adjusting jacking bolts 121 up or down to achieve the desired curve. Screw 103 is then tightened to prevent rotation of the knife, the knife is heated by resistance heater element 64, and then tested to see if the desired contact pattern has been attained with seal roll 24. The bowing process is repeated until the desired pattern is attained, whereupon lock nuts 129 are tightened to maintain the desired curve. By virtue of the end support assemblies 80, the hot knife 60 is now free to expand and contract along its length by sliding in the end supports, while maintaining the desired curve. Frequent readjustment of the knife to maintain a desired contact pattern is no longer required.

While the preferred attachment method for a heated sealing blade has been described that permits axial expansion and contraction of the heated knife while maintaining a preset knife bow, other similar embodiments could be devised by one skilled in the art of heat sealing without departing from the scope of the invention.

I claim:

1. A thermal expansion compensated heat sealing apparatus comprising:
   a) a support beam including means for mounting said heat sealing apparatus to a means for reciprocating said heat sealing apparatus towards and away from a workpiece;
   b) a heated knife body for engagement with said workpiece;
   c) a fixed support assembly for connecting the heated knife body to the support beam at one point;
   d) an end support assembly adapted to permit sliding of the heated knife body parallel to the support beam while permitting rotation of the end of the knife body in a plane parallel to the plane of seal bar reciprocation; and
   e) one or more jacking bolts between the support beam and the hot knife body and located between the fixed support and the end support for forcing the hot knife body towards or away from the support beam.

2. Apparatus according to claim 1 whereby said end support comprises:
   a) an upper bracket containing two aligned bores parallel to the centerline of the support beam;
   b) a lower bracket containing two aligned bores perpendicular to the long dimension of the hot knife body and to the plane of reciprocation;
   c) a cross for connecting said upper bracket and said lower bracket, said cross having two aligned cylindrical surfaces adapted to slidingly engage the aligned bores of the upper bracket and two aligned cylindrical surfaces adapted to rotatingly engage the aligned bores in the lower bracket.

3. Apparatus according to claim 2 further comprising a second end support located at the end of the heat sealing bar away from said first end support, said fixed support located near the center of said heat sealing bar.

4. Apparatus according to claim 3 wherein said jacking bolts are spaced in the range of 5 to 10 inches from each other and from said fixed support and said end support.

5. In an apparatus for heat sealing and severing plastic film of the type including a shaped and heated sealing bar, a beam for supporting the sealing bar and for mounting the sealing bar to a mechanism that reciprocates said sealing bar towards and away from the plastic film to be heat sealed and severed, and means for connecting said heat sealing bar and said beam, an improved means for connecting comprising; a fixed support, an end support adapted to permit sliding of the heated sealing bar relative to the support beam and rotation of the sealing bar end in a plane parallel to the plane of reciprocation, and one or more jacking screws between said fixed support and said end support for adjusting the shape of said heated sealing bar.

6. Apparatus according to claim 5, further comprising a second end support at the end of the heat sealing bar away from the first end support, and said fixed support located near the center of said heat sealing bar.

7. Apparatus according to claim 6 wherein said end support comprises an upper bracket, a lower bracket, and a cross connecting said upper and lower brackets, said cross having cylindrical ends adapted to slide in corresponding bores in said upper bracket, said cylindrical end and bores oriented in a direction essentially parallel to said heat sealing bar, and said cross having a second set of cylindrical ends oriented essentially perpendicular to said first set and the plane of reciprocating and adapted to rotate in corresponding bores in said lower bracket, whereby said heat sealing bar may slide in a direction parallel to said support beam and rotate in a plane parallel to the plane of reciprocation.

8. Apparatus according to claim 7 wherein said jacking bolts are located at a distance from each other and said end and fixed supports at a distance in the range of 5 to 10 inches.

* * * * *